United States Patent
Lee et al.

(10) Patent No.: US 11,680,160 B2
(45) Date of Patent: Jun. 20, 2023

(54) POLYOLEFIN RESIN COMPOSITION AND PRODUCTION METHOD OF SAME

(71) Applicant: DL CHEMICAL CO., LTD., Seoul (KR)

(72) Inventors: Jang Woo Lee, Daejeon (KR); Byung Keel Sohn, Daejeon (KR); Sah Mun Hong, Daejeon (KR); Da Jung Kim, Daejeon (KR); Hee Jun Lee, Sejong-si (KR); Sung Ho Choi, Sejong-si (KR); Su Hyun Park, Busan (KR)

(73) Assignee: DL CHEMICAL CO., LTD., Seoul (KR)

( * ) Notice: Subject to any disclaimer, the term of this patent is extended or adjusted under 35 U.S.C. 154(b) by 236 days.

(21) Appl. No.: 17/044,505

(22) PCT Filed: Apr. 2, 2019

(86) PCT No.: PCT/KR2019/003896
§ 371 (c)(1),
(2) Date: Oct. 1, 2020

(87) PCT Pub. No.: WO2019/194547
PCT Pub. Date: Oct. 10, 2019

(65) Prior Publication Data
US 2021/0115236 A1    Apr. 22, 2021

(30) Foreign Application Priority Data

Apr. 5, 2018 (KR) .................. 10-2018-0039862

(51) Int. Cl.
| | | |
|---|---|---|
| *C08F 210/16* | (2006.01) | |
| *C08L 23/20* | (2006.01) | |
| *C08J 5/18* | (2006.01) | |
| *C08F 2/00* | (2006.01) | |

(52) U.S. Cl.
CPC ............ *C08L 23/20* (2013.01); *C08F 210/16* (2013.01); *C08J 5/18* (2013.01); *C08F 2/001* (2013.01); *C08F 2500/10* (2013.01); *C08F 2500/12* (2013.01); *C08F 2500/37* (2021.01); *C08J 2323/20* (2013.01); *C08J 2423/20* (2013.01); *C08L 2203/16* (2013.01); *C08L 2205/025* (2013.01); *C08L 2207/062* (2013.01)

(58) Field of Classification Search
CPC ........ C08F 210/16; C08F 2/001; C08F 4/659; C08F 4/6592; C08F 2500/10; C08F 2500/12; C08F 2500/37
See application file for complete search history.

(56) References Cited

U.S. PATENT DOCUMENTS

| | | | |
|---|---|---|---|
| 6,410,659 B1 | 6/2002 | Maddox et al. | |
| 7,989,564 B2 | 8/2011 | Loveday et al. | |
| 9,181,372 B2 | 11/2015 | Yang et al. | |
| 11,332,553 B2* | 5/2022 | Kim | ............ C08F 4/65916 |
| 2014/0179873 A1* | 6/2014 | Lam | ............ C08J 5/18 |
| | | | 525/240 |

FOREIGN PATENT DOCUMENTS

| | | |
|---|---|---|
| KR | 10-2004-0004447 A | 1/2004 |
| KR | 10-0531600 B1 | 5/2005 |
| KR | 10-2013-0051467 A | 5/2013 |
| KR | 10-2015-0096665 A | 8/2015 |
| KR | 10-2015-0099543 A | 8/2015 |
| WO | 2016/172279 A1 | 10/2016 |

OTHER PUBLICATIONS

English translation of the Written Opinion of the International Search Authority dated Jul. 24, 2019 issued in corresponding International Application No. PCT/KR2019/003896.

English translation of the International Search Report dated Jul. 24, 2019 issued in corresponding International Application No. PCT/KR2019/003896.

Zuccaccia, et al., "C—H Activation and Olefin Insertion as Sources of Multiple Sites in Olefin Polymerization Catalyzed by CpAlkyl(Hf(IV) Complexes", ACS Catalysis, vol. 7, pp. 563-567, 2017.

Sturzel, et al., "From Multisite Polymerization Catalysis to Sustainable Materials and All-Polyolefin Composites", Chemical Reviews, vol. 116, pp. 1398-1433, 2016.

* cited by examiner

*Primary Examiner* — Rip A Lee
(74) *Attorney, Agent, or Firm* — Nath, Goldberg & Meyer; Joshua B. Goldberg (57) ABSTRACT

Disclosed are a polyolefin resin composition and a production method using same. The polyolefin resin satisfies the following conditions: (1) melt index (MI2.16, 190° C., under a load of 2.16 kg) is 0.1 to 1.5 g/10 min; (2) density is 0.91 to 0.93 g/cc; (3) polydispersity Index (Mw (weight-average molecular weight)/Mn (number-average molecular weight)) is 3 to 7; (4) Mz (Z-average molecular weight)/Mw (weight-average molecular weight) is 2.3 to 4.5; and (5) COI (Comonomer Orthogonal Index) value calculated by Equation 1 in the specification is 5 to 12. In Equation 1, "SCB number at Mz" represents average number of branches derived from comonomers per 1000 carbon atoms at Z-average molecular weight (Mz), and "SCB number at Mn" represents average number of branches derived from comonomers per 1000 carbon atoms at number-average molecular weight (Mn) based on a molecular weight-comonomer distribution graph.

9 Claims, 3 Drawing Sheets

POLYOLEFIN RESIN COMPOSITION AND PRODUCTION METHOD OF SAME

This is a National Phase Application filed under 35 U.S.C. 371 as a national stage of PCT/KR2019/003896, filed Apr. 2, 2019, an application claiming the benefit of Korean Application No. 10-2018-0039862, filed Apr. 5, 2018, the content of each of which is hereby incorporated by reference in its entirety.

TECHNICAL FIELD

This invention relates to a polyolefin resin composition and a method for preparing the same, and more particularly, to a polyolefin resin composition having an improved dart falling impact strength which is useful in fields of stretch films, overlap films, high strength films and so on requiring high impact strength, and a method for preparing the same.

BACKGROUND ART

LLDPE (Linear Low-Density Polyethylene) is produced by copolymerizing ethylene and alpha-olefin (commercially, 1-butene, 1-hexene and 1-octene are commonly used) using a polymerization catalyst at low pressure, and it has a low molecular weight distribution and few LCB (Long-Chain Branch). Also, it has good physical properties of breaking strength, strain %, tear strength, dart falling impact strength (Dart Falling Impact Strength) and so on at a density level similar to LDPE (Low-Density Polyethylene) produced by a conventional high-pressure method.

Due to such properties of LLDPE, LLDPE is being widely used in the application fields of stretch films, overlap films, and so on to which the conventional LDPE or HDPE (High-Density Polyethylene) are difficult to be used. In such applications, the films should have excellent processability (workability) and breaking strength, tear strength, dart falling impact strength and haze. Among them, dart falling impact strength and processability are important physical properties required in a field of the recent high strength films.

ZN(Ziegler-Natta)-LLDPE produced by using a conventional ZN(Ziegler-Natta) catalysts has broad molecular weight distribution so that its processability is excellent, but its physical properties are not satisfactory. On the other hand, the mLLDPE prepared by using a metallocene catalyst having a single active site has excellent physical properties, but it has a disadvantage of low processability due to a narrow molecular weight distribution. To overcome these problems, researches on BOCD (Broad Orthogonal Composition Distribution) polymer structure in which co-monomers such as alpha-olefins are predominantly incorporated into high molecular weight chains, have been actively conducted. When the BOCD characteristic is achieved, relatively large amount of alpha-olefin comonomers is distributed in high molecular weight ethylene chains. Thus, the mechanical properties such as breaking strength, tear strength, dart falling impact strength and so on are improved.

Hafnium-based metallocene catalysts are known to achieve the BOCD structure (C. Zuccaccia, L. Tensi, R. L. Kuhlman, A. P. G. Jr., A. Macchioni, ACS Catalysis, 2017, 7, 563-567). The use of multiple catalyst species or cascade operation is essential when making BOCD structures using catalyst species that do not exhibit the BOCD structure. When two or more catalyst species are used, the first catalyst species can form a low molecular weight main chain having a low comonomer content and the second catalyst species can form a high molecular weight main chain having a high comonomer content, respectively. When cascade operation is performed in a polymerization process in which two or more reactors are connected in series, a high molecular weight main chain with a low comonomer content can be made in a first reactor and a high molecular weight main chain with a high comonomer content can be made in a second reactor, or a high molecular weight main chain with a high comonomer content can be produced in the first reactor and a low molecular weight main chain with a low monomer content can be made in the second reactor.

U.S. Pat. No. 6,410,659 discloses a method for producing a low molecular weight main chain using a metallocene catalyst with low comonomer reactivity as the first catalyst species and for producing a high molecular weight main chain using a Ziegler-Natta catalyst as the second catalyst.

U.S. Pat. No. 7,989,564 discloses a method for realizing BOCD structure by using a catalyst system having a hafnium-based metallocene catalyst as the first catalyst and a zirconium-based metallocene catalyst as the second catalyst.

U.S. Pat. No. 9,181,372 discloses a method for realizing BOCD structure by using a catalyst system having total three metallocene catalyst species (hafnium catalyst and zirconium system are mixed).

Korean Patent No. 1,397,077 discloses a polyethylene for a film having excellent dart falling impact strength and transparency using a hybrid supported metallocene catalyst in which at least two different metallocene compounds are supported, and a method for producing the same.

In the case of using a catalyst system including at least two catalyst species as described above, there is an advantage in that a single reactor operation is available. However, since each of the catalyst species should be independent, have high stability, and have similar polymerization kinetics to each other, it is not easy to find an appropriate combination and composition of catalyst species. Therefore, considering engineering aspects, a cascade reactor technology is mainly and commercially used (M. Sturzel, S. Mihan, R. Mulhaupt, Chemical Reviews, 2016, 116, 1398-1433).

Under these circumstances, in order to satisfy various specifications required by application fields or customers, there is a need to develop the cascade reactor technology so that the processability and the properties are properly traded-off, or even more ideally, polyethylene product having the properties of the metallocene polyethylene and the processability of the Ziegler-Natta polyethylene at the same time can be prepared.

DISCLOSURE OF INVENTION

An object of the present invention is to provide a polyolefin composition having improved processability and dart falling impact strength, wherein the polyolefin composition is prepared either by polymerizing independently a first polymer component having high MI (Melt Index) and high density and a second polymer component having low MI and low density and then melt-blending them, or by split operations for MI and density by using serially connected two or more reactors in which polymerization processes are carried out.

Another object of the present invention is to provide a stretch film, an overlap film, a high-strength film, etc. that require high impact strength by using a polyolefin resin having a proper molecular weight distribution and a new BOCD structure composition.

For achieving the above objects, the present invention provides a polyolefin resin satisfying the following properties (1) to (5):
(1) Melt index (MI2.16, 190° C., under a load of 2.16 kg) is 0.1 to 1.5 g/10 min; (2) Density is 0.91 to 0.93 g/cc; (3) Polydispersity Index (Mw (weight-average molecular weight)/Mn (number-average molecular weight)) is 3 to 7; (4) Mz (Z-average molecular weight)/Mw (weight-average molecular weight) is 2.3 to 4.5; and (5) COI(Comonomer Orthogonal Index) value calculated by the following Equation 1 is 5 to 12.

$$\text{Comonomer Orthogonal Index } (COI) = \frac{SCB \text{ number at } Mz - SCB \text{ number at } Mn}{\log Mz - \log Mn} \quad [\text{Equation 1}]$$

In Equation 1, "SCB number at Mz" represents average number of branches derived from comonomers per 1000 carbon atoms at Z-average molecular weight (Mz), and "SCB number at Mn" represents average number of branches derived from comonomers per 1000 carbon atoms at number-average molecular weight (Mn) when a molecular weight-comonomer distribution graph was prepared in which log value (log Mw) of molecular weight (Mw) is marked in x-axis of the graph and the amount of polymer (dw_dlog Mw) corresponding to the log value (log Mw) and average number of short chain branches (SCB) derived from comonomer (number of branches per 1,000 carbon atoms, unit: number/1,000 C) corresponding to the log value (log Mw) are marked in y-axis of the graph.

The present invention provides a polyolefin resin satisfying the following properties (1) to (6): (1) Melt index (MI2.16, 190° C., under a load of 2.16 kg) is of 0.1 to 1.5 g/10 min; (2) Density is of 0.91 to 0.93 g/cc; (3) Polydispersity Index (Mw/Mn) is 3 to 7; (4) Mz/Mw is 2.3 to 4.5; (5) COI value calculated by Equation 1 is 5 to 12; and (6) When TREF (Temperature Rising Elution Fractionation) curve of multimodal distribution is deconvoluted, the area of TREF curve having a peak at 60 to 70° C. is 40 to 65% of the total area of the TREF curve of multimodal distribution.

In addition, the present invention provides a method for preparing a polyolefin resin comprising the steps of: polymerizing a first polymer having high density and high MI (Melt Index) by introducing a metallocene supported catalyst, ethylene and alpha-olefin to a first reactor of two or more serially connected reactors selected from the group consisting of a slurry polymerization reactor and a gas phase polymerization reactor; and polymerizing polyolefin resin by transferring the first polymer to a second reactor of the two or more serially connected reactors, wherein the polyolefin resin satisfies the following conditions: (1) Melt index (MI2.16, 190° C., under a load of 2.16 kg) is 0.1 to 1.5 g/10 min; (2) Density is 0.91 to 0.93 g/cc; (3) Polydispersity Index (Mw (weight average molecular weight)/Mn (number average molecular weight)) is 3 to 7; (4) Mz (Z-average molecular weight)/Mw (weight-average molecular weight) is 2.3 to 4.5; (5) COI(Comonomer Orthogonal Index) value calculated by Equation 1 is 5 to 12; and (6) When the TREF curve of multimodal distribution is deconvoluted, the area of the TREF curve having a peak at 60 to 70° C. is 40 to 65% of the total area of the TREF curve of multimodal distribution.

In addition, the present invention provides a method for preparing a polyolefin resin comprising the steps of: introducing a metallocene supported catalyst, ethylene and alpha-olefin to a reactor selected from the group consisting of a slurry polymerization reactor and a gas phase polymerization reactor to prepare a first polymer with MI of 4 to 15 and density of 0.925 to 0.940 g/cc; introducing a metallocene supported catalyst, ethylene and alpha-olefin to a reactor selected from the group consisting of a slurry polymerization reactor and a gas phase polymerization reactor to prepare a second polymer with MI of 0.1 to 0.5 and density of 0.900 to 0.915 g/cc; and carrying out melt-blending of the first polymer and the second polymer component to prepare a polyolefin resin, wherein the polyolefin resin satisfies the following conditions: (1) Melt index (MI2.16, 190° C., under a load of 2.16 kg) is 0.1 to 1.5 g/10 min; (2) Density is 0.91 to 0.93 g/cc; (3) Polydispersity Index (Mw/Mn) is 3 to 7; (4) Mz/Mw is 2.3 to 4.5; (5) COI value calculated by Equation 1 is of 5 to 12; and (6) When the TREF curve of multimodal distribution is deconvoluted, the area of the TREF (Temperature Rising Elution Fractionation) curve having a peak at 60 to 70° C. is 40 to 65% of the total area of the TREF curve of multimodal distribution.

The polyolefin resin according to the present invention has an appropriate molecular weight distribution and exhibits a new BOCD structure composition, so as to have excellent processability and dart falling impact strength. Therefore, the polyolefin resin according to the present invention can be used for manufacturing stretch films, overlap films or high strength films that require high impact strength.

BEST MODES FOR CARRYING OUT THE INVENTION

In the present specification, the terms 'first', 'second' etc. are used to describe various components and used only for the purpose of distinguishing one component from another.

The terminology used herein is for the purpose of describing exemplary embodiments only and is not intended to limit the invention. The singular forms include plural referents unless the context clearly dictates otherwise. In the present specification, the terms 'including', 'comprising' or 'having' are intended to indicate that there may exist any features, numbers, steps, elements, or a combination thereof and it should be understood that they does not preclude the presence or addition of one or more other features, numbers, steps, components or combinations thereof.

While the invention is susceptible to various modifications and alternative forms, specific embodiments thereof are shown by way of example in the drawings and will herein be described in detail. It should be understood, however, that the invention is not intended to be limited to the particular form disclosed, but includes all modifications, equivalents, and alternatives falling within the spirit and scope of the invention.

The polyolefin resin according to an embodiment of the present invention satisfies the following physical properties:

(1) Melt index (MI2.16, 190° C., under a load of 2.16 kg) is 0.1 to 1.5 g/10 min;

(2) Melt flow rate ratio (MFRR; MI21.6/MI2.16, the MI21.6 is the melt index measured at 190° C. and 21.6 kg load condition) is 17 to 40.

(3) Density is 0.91 to 0.93 g/cc;

(4) Polydispersity Index (Mw (weight-average molecular weight)/Mn (number-average molecular weight)) is 3 to 7;

(5) Mz (Z-average molecular weight)/Mw (weight-average molecular weight) is 2.3 to 4.5;

(6) COI(Comonomer Orthogonal Index) value calculated by the following Equation 1 is 5 to 12.

$$\text{Comonomer Orthogonal Index } (COI) = \frac{SCB \text{ number at } Mz - SCB \text{ number at } Mn}{\log Mz - \log Mn} \quad \text{[Equation 1]}$$

In Equation 1, "SCB number at Mz" represents average number of branches derived from comonomers per 1000 carbon atoms at Z-average molecular weight (Mz), and "SCB number at Mn" represents average number of branches derived from comonomers per 1000 carbon atoms at number-average molecular weight (Mn) when a molecular weight-comonomer distribution graph was prepared in which log value (log Mw) of molecular weight (Mw) is marked in x-axis of the graph and the amount of polymer (dw_dlog Mw) corresponding to the log value (log Mw) and average number of short chain branches (SCB) derived from comonomer (number of branches per 1,000 carbon atoms, unit: number/1,000 C) corresponding to the log value (log Mw) are marked in y-axis of the graph.

The polyolefin resin according to the present invention may have (1) the melt flow index (MI2.16) of 0.1 to 1.5 g/10 min, which is measured at 190° C., under a load of 2.16 kg).

The polyolefin resin according to the present invention may have (2) the MFRR (MI21.6/MI2.16, the MI21.6 is the melt index measured at 190° C. and 21.6 kg load condition) of 17 to 40, preferably 25 to 35. If the MFRR is out of the above range, there is a problem that it is difficult to satisfy both processability and physical properties.

(3) The density may be 0.91 to 0.93 but is not limited thereto.

(4) The polydispersity Index (Mw/Mn) may be of 3 to 7, preferably 4 to 6. If the Polydispersity Index is out of the above range, there is a problem that it is difficult to satisfy both processability and physical properties.

Further, (5) the Mz/Mw may be 2.3 to 4.5, preferably 3.3 to 4.0. It the Mz/Mw is out of the above range, there is a problem that it is difficult to satisfy both processability and physical properties.

(6) The COI(Comonomer Orthogonal Index) is a measure showing how the content of comonomers such as alpha-olefins is distributed according to molecular weight.

SCB(Short Chain Branch) in Equation 1, when using an alpha-olefin as a comonomer in the ethylene polymerization process, refers to the side branches attached to the main chain derived therefrom. The side branches include both SCB having 1 to 6 carbon atoms and LCB (Long Chain Branch) having 7 or more carbon atoms.

The COI can be calculated from Mz, Mn, content of SCB, which are measured by Gel Permeation Chromatography with IR detector (GPC-IR).

In Equation 1, "SCB number at Mz" represents average number of branches derived from comonomers per 1000 carbon atoms at Z-average molecular weight (Mz), and "SCB number at Mn" represents average number of branches derived from comonomers per 1000 carbon atoms at number-average molecular weight (Mn) when a molecular weight-comonomer distribution graph was prepared in which log value (log Mw) of molecular weight (Mw) is marked in x-axis of the graph and the amount of polymer (dw_dlog Mw) corresponding to the log value (log Mw) and average number of short chain branches (SCB) derived from comonomer (number of branches per 1,000 carbon atoms, unit: number/1,000 C) corresponding to the log value (log Mw) are marked in y-axis of the graph.

When the value of COI is positive, it means that the polymer has a higher comonomer content in the high molecular weight region as compared with the low molecular weight region. On the contrary, when the value of COI is negative, it means that the polymer has a higher comonomer content in the low molecular weight region as compared with the high molecular weight region.

The COI value of the polyolefin according to the present invention, calculated by the above method is about 5 to 12, preferably about 6 to 12, more preferably about 7 to 10. When the COI value is 5 or less, the mechanical properties of the polymer may be deteriorated due to the low BOCD (Broad Orthogonal Composition Distribution) property. When the COI value is 12 or more, the mechanical properties of the polymer are excellent due to the high BOCD property, however, there is a fear that the quality of the molded article may deteriorate due to the increase in haze and the generation of fish eyes when the film is produced from such a polymer because the miscibility between the polymer components is lowered. That is, the polyolefin resin according to the present invention shows such BOCD characteristic that the SCB content is low in a low molecular weight region and the SCB content is relatively high in a high molecular weight region, slope thereof being within the range of the above COI value. In addition, the polyolefin according to the present invention has 3 to 20, preferably 5 to 20 of average number of SCBs per 1000 carbon atoms (1000 C) at the entire range of molecular weight measured. The average number of SCBs per 1,000 carbons in the entire range of molecular weight is a measure of the content of average comonomer contained in the polyolefin resin.

When the COI value is within the above range and the Mw/Mn is 1 to 3, being narrow, the physical properties of the polyolefin resin are optimized to exhibit high impact strength and good mechanical properties. However, in this case, since the processability is lowered, it is preferable that the molecular weight distribution (Mw/Mn) is increased to from 3 to 7.

Therefore, when the following conditions are satisfied in the polyolefin of the present invention, the dart falling impact strength and processability can be satisfied at the same time. The conditions are as follows: COI value, melt flow index, the melt flow rate ratio (MFRR), density, etc. are within the above-mentioned range; Mw/Mn is 3 to 7; and Mz/Mw is 2.3 to 4.5.

The polyolefin resin according to another embodiment of the present invention satisfies the following physical properties:

(1) Melt index (MI2.16, 190° C., under a load of 2.16 kg) is 0.1 to 1.5 g/10 min;

(2) Melt flow rate ratio (MFRR; MI21.6/MI2.16, the MI21.6 is the melt index measured at 190° C. and 21.6 kg load condition) is 17 to 40.

(3) Density is 0.91 to 0.93 g/cc;

(4) Polydispersity Index (Mw (weight average molecular weight)/Mn (number average molecular weight)) is 3 to 7;

(5) Mz (Z-average molecular weight)/Mw (weight-average molecular weight) is 2.3 to 4.5;

(6) COI(Comonomer Orthogonal Index) value calculated by the following Equation 1 is 5 to 12; and (7) When the TREF curve of multimodal distribution is deconvoluted, the area of the TREF curve having a peak at 60 to 70° C. is 40 to 65% of the total area of the TREF curve of multimodal distribution.

$$\text{Comonomer Orthogonal Index } (COI) = \frac{SCB \text{ number at } Mz - SCB \text{ number at } Mn}{\log Mz - \log Mn} \quad \text{[Equation 1]}$$

In Equation 1, "SCB number at Mz" represents average number of branches derived from comonomers per 1000 carbon atoms at Z-average molecular weight (Mz), and "SCB number at Mn" represents average number of branches derived from comonomers per 1000 carbon atoms at number-average molecular weight (Mn) when a molecular weight-comonomer distribution graph was prepared in which log value (log Mw) of molecular weight (Mw) is marked in x-axis of the graph and the amount of polymer (dw_dlog Mw) corresponding to the log value (log Mw) and average number of short chain branches (SCB) derived from comonomer (number of branches per 1,000 carbon atoms, unit: number/1,000 C) corresponding to the log value (log Mw) are marked in y-axis of the graph.

The physical properties of (1) to (6) satisfy the above conditions.

(7) The TREF (Temperature Rising Elution Fractionation) curve of multimodal distribution shows the chemical composition distribution of the polymer. In the TREF curve of multimodal distribution, a peak at a relatively low temperature indicates a large number of branches (chains), and a peak at a relatively high temperature indicates a small number of branches (chains).

When the TREF curve of multimodal distribution is deconvoluted, the area of the TREF curve having a peak at 60 to 70° C. is adjusted to be 40 to 65% of the total area of the TREF curve of multimodal distribution so that the dart falling impact strength and processability can be satisfied at the same time. If the area of the TREF curve having a peak of 60 to 70° C. is 40% or less, there is a problem that mechanical properties are lowered, and if it is 65% or more, the melting point is lowered due to the low density, thereby causing a problem in process stability.

The area of the TREF peak located at 60 to 70° C. in the above TREF curve of multimodal distribution means the content of a copolymer with many branches derived from a comonomer, and when the proper content of the copolymer with many branches at long chain is contained, the dart falling impact strength and the processability can be simultaneously satisfied.

Deconvolution of the TREF curve means separating the TREF curve into a plurality of individual peaks. The total area of the TREF curve of multimodal distribution may be an area by the entire TREF curve before deconvolution or an area by the entire curve by summing a plurality of individual peaks when deconvoluted.

In the polyolefin resin according to the present invention, the number of deconvoluted peaks in the TREF curve is, for example, 2 to 5, preferably 3 to 5.

The polyolefin resin according to another embodiment of the present invention is more excellent in dart falling impact strength and processability, if the area of its TREF (Temperature Rising Elution Fractionation) curve having a peak of 60 to 70° C. is 40 to 65% relative to the total area of the TREF peak of the multimodal distribution, when being deconvoluted, while maintaining melt index, melt flow rate, and density, etc. being within the above-described range, Mw/Mn being of 3 to 7, Mz/Mw being of 2.3 to 4.5 and the COI value being within the above range.

It is preferable that the polyolefin resin satisfying the physical properties according to the present invention is a copolymer of ethylene, an olefinic monomer, and an alpha-olefin comonomer. As the comonomer, an alpha-olefin having 3 or more carbon atoms may be used. Examples of the comonomer having 3 or more carbon atoms include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-octadecene or 1-eicocene, and the like. The content of the alpha-olefin comonomer may be 1 to 4 mol %, preferably 1.4 to 4 mol % in the copolymer of ethylene and alpha-olefin.

The polyolefin resin according to the present invention may be used alone or in a blended form with other (namely, heterogeneous) polymer having different MI (Melt Index) and density values from those of the present invention, so that it can be applied in various fields such as stretch films, overlap films or high strength films requiring high impact strength with excellent processability. The other polymer may include a first polymer component having a high MI and density and a second polymer component having a low MI and density. The first polymer component having high MI and density and the second polymer component having low MI and density are each independently polymerized, thereafter which are melt-blended, so that the polyolefin resin according to the present invention has characteristic molecular weight and comonomer distribution thereby to improve dart falling impact strength and processability.

LDPE is mainly used commercially as the other polymer. For example, the other polymer may contain a first polymer having an MI of 4 to 15, a density of 0.925 to 0.940 g/cc, and a second polymer having an MI of 0.1 to 0.5 and a density of 0.900 to 0.915 g/cc. The content ratio of the first polymer and the second polymer may be 50:50 to 35:65 based on the total weight of the polyolefin resin.

The weight-average molecular weight (Mw) of the polyolefin resin according to the present invention may be 50,000 to 200,000 g/mol, preferably 60,000 to 170,000 g/mol, more preferably 100,000 to 160,000 g/mol, but limited thereto. If the weight-average molecular weight (Mw) of the polyolefin resin is 50,000 or less, there are problems such as deterioration of physical properties and generation of fume during extrusion processing, and If it is 200,000 or more, there is a problem of lowering the extrusion processing efficiency (high energy consumption per extrusion content).

A composition of metallocene supported catalyst used in the present invention includes a metallocene catalyst, aluminoxane, a porous carrier and a modifier. As the metallocene catalyst component, various metallocene components commonly used in ethylene polymerization can be used without limitation, but it is preferable to use a compound represented by the following formula (1).

[Formula 1]

In Formula 1, Cp is a cyclopentadienyl radical, and R1 and R2 are each independently hydrogen, phosphine, amino, an alkyl, alkoxy, alkylamino, dialkylamino, alkoxy-alkyl, aryl, aryloxy-alkyl, alkenyl, alkylaryl, or arylalkyl radical having 1 to 20 carbon atoms, for example, methyl, 1-propyl, 1-butyl, methoxy and the like, and preferably 1-propyl or 1-butyl. M is a transition metal of group 4 in the periodic table, i.e. titanium, zirconium, hafnium, X each is independently halogen or an alkyl, aryl, alkenyl, alkylaryl, arylalkyl, alkoxy or aryloxy radical having 1 to 20 carbon atoms, for example chloride, methyl, benzyl, and the like.

The following are known for realizing such BOCD characteristic: (i) use of special catalytic species capable of expressing the BOCD structure BOCD; or (ii) use of two or more catalytic species in which a first catalyst species forms a polymer having a low comonomer reactivity and a relatively low molecular weight and a second catalyst species form a polymer having a high comonomer reactivity and a relatively high molecular weight; or (iii) a method of operating a cascade reactor using two or more reactors, wherein a first polymer component having a relatively low comonomer content and a low molecular weight is produced in one reactor, and a second polymer component having a relatively high comonomer content and a high molecular weight produced in another reactor, and so on. Among them, the catalytic system employing a plurality of catalytic species or the cascade operation of the reactor, can broaden the molecular weight distribution as well as expression of BOCD characteristics to improve both mechanical properties and processability.

Therefore, the supported catalyst used in the present invention is a metallocene compound on which one selected from the group consisting of titanium, zirconium, and hafnium is supported. More preferably, hafnium that exhibits a BiOCD structure in the supported catalyst is included as the central metal. It is preferred that a hafnium-based metallocene catalyst in which at least one selected from a 1-propyl cyclopentadienyl radical and a 1-butyl cyclopentadienyl radical is contained as a ligand.

The aluminoxane used in the catalyst composition of the present invention acts as an activator or cocatalyst, and it can be a conventional methyl aluminoxane (MAO) or modified methyl aluminoxane (MMAO) which is known to be suitable for olefin polymerization, and in addition, can be any commercially available aluminoxane. The aluminoxane can be prepared by adding an appropriate content of water to trialkyl aluminum, or by reacting a hydrocarbon or inorganic hydrate salt containing water and trialkyl aluminum, and in general, has the form of a linear or circular oligomer hydrocarbyl aluminoxane. Typical linear aluminoxanes are represented by the following Formula 2, and typical circular aluminoxanes are represented by the following Formula 3.

[Formula 2]

-continued

[Formula 3]

In formulas 2 and 3, R' is a hydrocarbon radical, preferably a linear or branched alkyl radical of 1 to 10 carbon atoms. In formulas 2 and 3, most of R' is preferably a methyl group, and more preferably, 30 to 100%, and most preferably 50 to 70% of R' is a methyl group. In Formula 2, x is an integer of 1 to 50, preferably 4 to 30, and y is an integer of 3 to 50, preferably 4 to 30.

The aluminoxane is commercially available in the form of various types of hydrocarbon solutions, among which it is preferable to use an aromatic hydrocarbon solution aluminoxane, and more preferably, aluminoxane dissolved in toluene is used.

As the carrier, porous particles of a stable structure such as inorganic oxides or inorganic salts can be used without limitation. Practically useful carriers are inorganic oxides of elements belonging to Groups 2, 3, 4, 5, 13 or 14 of the Periodic Table. It is desirable that such carriers are silica, alumina, silica-alumina, or mixtures thereof, clay or modified clay, or mixtures thereof. It is more preferable to use spherical silica in the form as the carrier. In the inorganic oxide carrier water or a hydroxyl group must be removed therefrom before use, which can be done by heat treatment. The heat treatment of the carrier is performed by heating the carrier at a temperature of 200 to 800° C. while fluidizing the same in a vacuum or nitrogen atmosphere. The carrier used is in the form of a dried powder, whose average particle size is about 1 to 250 μm, preferably 10 to 150 μm, and whose surface area is about 5 to 1200 m$^2$/g, preferably about 50 to 500 m$^2$/g. The pore volume of the carrier is 0.1 to 5 cm$^3$/g, preferably 0.1 to 3.5 cm$^3$/g. The pore size of the carrier is about 5 to 50 nm, preferably 7.5 to 35 nm. The hydroxy present on the surface of the carrier is preferably about 0 to 3 mmol per gram of silica, more preferably 0.5 to 2.5 mmol. The content of such a hydroxy group depends on the dehydration or the calcining temperature of the carrier.

The modifier acts as a scavenger of free trialkyl aluminum in an aluminoxane solution known to cause fouling or sheeting of the reactor which inhibits process stability, and also serves as a coupling agent of aluminoxane for improving the catalytic activity. In the present invention, the modifier may be a phenol compound represented by the following Formula 4 (See: Korean Patent No. 531,600).

[Formula 4]

In Formula 4, R$_1$, R$_2$ and L are each independently hydrogen or Alkyl group, alkoxy group, aryl group, aryloxy group, alkenyl group of 1 to 10 carbon atoms having 1 to 10 carbon atoms, arylalkyl group, alkylaryl group, arylalkenyl group, cycloalkyl group, cycloalkylalkenyl group, heteroaryl group, heterocycloalkyl group having 6 to 10 carbon atoms, an alkyl group of 1 to 5 carbon atoms in which an alkyl group of 1 to 20 carbon atoms is bonded via —S—, —PO$_3$=, —CON—, —COO— and/or —O—, or a substituted or unsubstituted heteroarylamine group, and n is an integer of 1 to 4. Preferably, R$_1$ and R$_2$ are hydrogen or an alkyl group of 1 to 10 carbon atoms, and more preferably hydrogen, a methyl group or a tert-butyl group. When n is 2 or more, it is preferable that L is an aryl group of 6 to 12 carbon atoms as a linking agent.

The supported catalyst may be prepared by various methods, and one of them is to react for a certain time after dissolving the metallocene catalyst component, activator, and modifier in a solvent. Subsequently, a carrier is added and reacted under specific conditions, followed by washing and drying to complete the preparation of the supported catalyst.

The polyolefin resin of the present invention satisfying the above properties may be prepared by using a metallocene supported catalyst, ethylene (monomer) and alpha-olefin (comonomer), and (1) by polymerizing a first polymer component having high MI and density in a first reactor by split operation of MI (Melt Index) and density and by using polymerization process in which two or more reactors selected from the group consisting of a slurry polymerization reactor and a gas phase polymerization reactor are serially connected; and by polymerizing the polyolefin resin by transferring the first polymer to a second reactor. The two or more reactors may be the same or different from each other, and polymers having different densities and MI are polymerized by adjusting the amounts of the components of the composition. Therefore, by using the split process, the polyolefin composition of the present invention can be continuously produced.

As another method for preparing the polyolefin resin of the present invention, (2) different polyolefins are obtained in each of the two reactors, that is, a first polymer component with high MI and high density is obtained in one reactor: a second polymer component with low MI and low density is obtained in another reactor; and the first polymer component and the second polymer component are melt-blended to obtain the polyolefin of the present invention having a molecular weight distribution and a COI value as described above.

Specifically, the metallocene supported catalyst used in the present invention is suitable for homopolymerization of ethylene and copolymerization with any alpha-olefin comonomer by a solution, slurry or gas phase polymerization mechanism, particularly suitable for slurry or gas phase polymerization processes. Each polymerization reaction condition can be variously modified depending on types of metallocene catalyst components, compositions of supported catalysts, types of monomers and comonomers, polymerization methods (e.g., solution polymerization, slurry polymerization, gas phase polymerization), desired polymerization result or polymer form. Such olefin polymerization reaction temperature is usually about 20 to 200° C., and the polymerization pressure is 10 to 7000 psig. The molecular weight of the polyolefin prepared using the supported catalyst used in the present invention can be controlled by changing the polymerization temperature or by injecting hydrogen into the reactor.

The difference between the split operation method and the melt-blending method is as follows. The melt blending method has the advantage of relatively high stability of the polymerization process compared to the split operation method since the first polymer component and the second polymer component are prepared in separate reactors. On the other hand, the melt-blending method has a disadvantage of low mixing efficiency during extrusion processing, compared to fluff (In-Reactor Blend) containing both the first polymer component and the second polymer component, manufactured by a split operation method, since the resulting fluff-shaped unit polymer particles consist only of a single polymer component. In performing the split operation method of MI and density using a polymerization process in a system having serially connected two reactors, if the MI and density of the polymer produced from the first reactor are determined, the MI and density of the polymer to be produced in the second reactor can be determined in advance to meet the MI and density specifications of the final product. It is relatively easy to meet product specifications compared to the melt-blending method.

However, as mentioned above, there is a disadvantage in that the split range of MI and density is limited due to relatively low process stability. For example, in the first polymer component having high MI and density polymerized in the first reactor, if the MI is too high or the density is low, a sheeting problem in the reactor may occur due to the low melting point. In the second polymer component having low MI and density polymerized in the second reactor, if the MI is too low, it may cause problems of quality degradation, such as generation of fish-eyes. If the split range is too narrow, the BOCD characteristics are low and the melt flow rate ratio is small, which is disadvantageous in terms of improving physical properties and processability.

The above description is a matter that must be reviewed and verified before manufacturing the polyolefin resin composition of the present invention. The present inventors determined the split range and ratio of the MI and density of the first polymer component and the second polymer component based on the above contents and a lot of experimental data therefrom, and eventually successfully produced the polyolefin resin composition targeted by the present invention. Accordingly, the present invention can provide a polyolefin composition having improved processability and dart falling impact strength, and a method for manufacturing the same.

EMBODIMENTS FOR CARRYING OUT THE INVENTION

Hereinafter, the present invention is described in more detail through examples. The following example is only to help the understanding of the present invention, and the present invention is not limited by the following examples.

[Preparation 1] Preparation of Hafnium-Based Metallocene Supported Catalyst

To 250 mL-round flask, 211 mg of bis(1-propylcyclopentadienyl)hafnium dichloride (manufactured by MCN, China), 522 mg of Ethanox® 330 (Product name: Ethanox® 330, 1,3,5-trimethyl-2,4,6-tris(3,5)-di-ter-butyl-4-hydroxybenzyl)benzene, manufactured by Albemarle), 33.6 mL of 20% by weight MAO toluene solution (manufactured by Albemarle) and 14.2 mL of hexane were added and stirred at room temperature for 1 hour. Then, 10 g of silica (product name: ES70X, manufactured by PQ) calcined for 4 hours or more in a nitrogen atmosphere at 250° C. was put into the reactor, which was ultrasonicated at 60° C. for 6 hours. Thereafter, hexane washing and vacuum drying were performed to complete a solid metallocene supported catalyst.

[Preparation 2] Preparation of Zirconium-Based Metallocene Supported Catalyst

A supported catalyst was prepared in the same manner as in Preparation 1, except that 197 mg of bis(1-butyl-3- methylcyclopentadienyl)zirconium dichloride (manufactured by Korea s-PCI) was used.

[Example 1-1 for Polymerization] Preparation of the First Polymer Component with High MI and Density A 2 L-stainless autoclave reactor equipped with a jacket that can supply external cooling water to control the polymerization temperature is purged 10 times with nitrogen at room temperature, heated to 78° C., and then again purged with nitrogen 10 times, and finally, the feed line and reactor were purged using 400 mL of isobutane and 10 bar of ethylene. After adjusting the reactor temperature to 70° C., 1 mL of 0.2 M triethylaluminum, 2.5 mL of an antistatic agent (Statsafe® 3000, manufactured by Innospec), and 1 L of isobutane were added to the reactor. Then, to the reactor ethylene was added so that the partial pressure of ethylene was 100 psig, 25 mL of 1-hexene was added, and 200 mg of the supported catalyst of Preparation 1 was added, and then polymerization was carried out for 2 hours. During the polymerization, ethylene partial pressure was maintained at 100 psig, and by measuring the flow rate of additionally added ethylene with a mass flowmeter, it was adjusted so that 4% by weight of 1-hexene relative to the input ethylene and 130 ppmw of hydrogen relative to the input ethylene were continuously added. After the polymerization reaction is completed, the reactor is sufficiently purged with nitrogen to remove unreacted olefin and isobutane. The reactor was opened and the polymer in the form of fluff was recovered, and then sufficiently dried for at least 8 hours in a fume hood.

[Example 1-2 for Polymerization] Preparation of the First Polymer Component with High MI and Density Polymerization was carried out in the same manner as in Example 1-1 for Polymerization except for the supported catalyst input (60 mg) in Preparation 1 and 1-hexene input (15 mL) before polymerization and 1-hexene input (3% by weight relative to ethylene) during polymerization.

[Example 1-3 for Polymerization] Preparation of the First Polymer Component with High MI and Density Polymerization was carried out in the same manner as in Example 1-1 for Polymerization except for the 1-hexene input (5% by weight relative to ethylene) and hydrogen input (140 ppmw relative to ethylene) during polymerization.

[Example 2-1 for Polymerization] Preparation of the Second Polymer Component with Low MI and Density Polymerization was carried out in the same manner as in Example 1-1 for Polymerization except for the supported catalyst input (100 mg) in Preparation 1 and 1-hexene input (45 mL) before polymerization and 1-hexene input (9% by weight relative to ethylene), hydrogen input (20 ppmw relative to ethylene) and ethylene partial pressure (130 psig) during polymerization.

[Example 2-2 for Polymerization] Preparation of the Second Polymer Component with Low MI and Density Polymerization was carried out in the same manner as in Example 2-1 for Polymerization except for hydrogen input (30 ppmw relative to ethylene) during polymerization.

[Example 2-3 for Polymerization] Preparation of the Second Polymer Component with Low MI and Density Polymerization was carried out in the same manner as in Example 2-1 for Polymerization except for the supported catalyst input (60 mg) in Preparation 1 before polymerization and hydrogen input (40 ppmw relative to ethylene) during polymerization.

Comparative Example 1 for Polymerization

Polymerization was carried out in the same manner as in Example 1-1 for Polymerization except for polymerization temperature (75° C.), the supported catalyst input (100 mg) of Preparation 1 and 1-hexene input (36 mL) before polymerization, and 1-hexene input (6% by weight relative to ethylene), hydrogen input (45 ppmw relative to ethylene) and partial pressure of ethylene (130 psig) during polymerization.

Comparative Example 2 for Polymerization

Polymerization was carried out in the same manner as in Example 1-1 for Polymerization except for polymerization temperature (75° C.), the supported catalyst input (90 mg) of Preparation 2 and 1-hexene input (45 mL) before polymerization, and 1-hexene input (8% by weight relative to ethylene), hydrogen input (8 ppmw relative to ethylene) and partial pressure of ethylene (130 psig) during polymerization.

[Example 1 for Melt Blend] Preparation of a Melt Blend Using the First Polymer Component and the Second Polymer Component A first polymer component having high MI and high density (Example 1-1 for Polymerization) and a second polymer component having low MI and low density (Example 2-1 for polymerization) were mixed in a weight ratio of 5:5, and thereto 500 ppmw of primary antioxidant (product name: 1010, Songwon Industries), 1,000 ppmw of secondary antioxidant (product name: 168, Songwon Industries) and 500 ppmw of polymer processing aid (PPA; product name: PA450, Hannanotek) were added. Thereafter, the mixture was put into a twin-screw extruder (type: 814 30 2, model name: 911436), and was produced in a melt blend at a processing temperature of 200° C. and a screw rotation speed of 60 rpm. Subsequently, the resultant was pelletized using a pelletizer.

[Example 2 for Melt Blend] Preparation of a Melt Blend Using the First Polymer Component and the Second Polymer Component The melt blend was prepared in the same manner as in Example 1 for Melt Blend except for mixing the first polymer component having high MI and density (Example 1-1 for Polymerization) and the second polymer component (Example 2-3 for Polymerization) having low MI and density in a weight ratio of 4:6.

[Example 3 for Melt Blend] Preparation of a Melt Blend Using the First Polymer Component and the Second Polymer Component The melt blend was prepared in the same manner as in Example 2 for Melt Blend except for the first polymer component having high MI and density (Example 1-1 for Polymerization) and the second polymer component having low MI and density (Example 2-2 for Polymerization).

[Example 4 for Melt Blend] Preparation of a Melt Blend Using the First Polymer Component and the Second Polymer Component The melt blend was prepared in the same manner as in Example 2 for Melt Blend except for the first polymer component having high MI and density (Example 1-2 for Polymerization) and the second polymer component having low MI and density (Example 2-1 for Polymerization).

[Example 5 for Melt Blend] Preparation of a Melt Blend Using the First Polymer Component and the Second Polymer Component The melt blend was prepared in the same manner as in Example 2 for Melt Blend except for the first polymer component having high MI and density (Example 1-3 for Polymerization) and the second polymer component having low MI and density (Example 2-1 for Polymerization).

[Film Preparation 1]

The melt blend (from Example 1 for Melt Blend) was put into a single-screw extruder (Type: 19 25/D, Model name 832005) and processed under processing conditions of at 200° C. of processing temperature, 60 rpm of screw rotation speed, 25 mm of die lip diameter, and 3.2 BUR(Blow-Up Ratio) to produce a film having a thickness of 30 μm.

[Film Preparation 2]

A film was prepared in the same manner as in Film Preparation 1, except that the melt blend (from Example 2 for Melt Blend) was used.

[Film Preparation 3]

A film was prepared in the same manner as in Film Preparation 1, except that the melt blend (from Example 3 for Melt Blend) was used.

[Film Preparation 4]

A film was prepared in the same manner as in Film Preparation 1, except that the melt blend (from Example 4 for Melt Blend) was used.

[Film Preparation 5]

A film was prepared in the same manner as in Film Preparation 1, except that the melt blend (from Example 5 for Melt Blend) was used.

[Comparative Film Preparation 1]

A film was prepared in the same manner as in Film Preparation 1, except that the polyolefin of Comparative Example 1 for Polymerization was used instead of the melt blend.

[Comparative Film Preparation 2]

A film was prepared in the same manner as in Film Preparation 1, except that the polyolefin of Comparative Example 2 for Polymerization was used instead of the melt blend.

Test Example

The structure and physical properties of the polyolefins of Examples 1-1 to 2-3 for Polymerization, Comparative Examples 1 and 2 for Polymerization, and Examples 1 to 5 for Melt Blend were evaluated by the following method, and the results thereof are summarized in Table 1. The dart falling impact strength impact strength of the polyolefin films manufactured (Film Preparation 1 to 5 and Comparative Film Preparation 1 and 2) was measured, and the results thereof are shown in Table 2 below.

1) Melt Index (MI2.16): Measured at 190° C., under a load of 2.16 kg, Unit: g/10 min, ASTM D1238

2) Melt Index (MI21.6): Measured at 190° C., under a load of 21.6 kg, Unit: g/10 min, ASTM D1238

3) Density: Measured by density gradient method, ASTM D1505

4) Molecular weight and molecular weight distribution: Measured using a gel permeation chromatography (GPC-RI) with a refractive index detector (RI) Detector (Gel Permeation Chromatography-RI; GPC-RI; Polymer Laboratory Inc. 220 System) as follows. Two Olexis and one Guard were used as the separation column, and the column temperature was maintained at 160° C. Calibration was performed using a standard polystyrene set from Polymer Laboratory Inc. Trichlorobenzene containing 0.0125% by weight of antioxidant (BHT) was used as an eluent. The measurement was carried out for 27 minutes in a condition of the sample concentration being 1.0 mg/mL, the injection content being 0.2 mL and a pump flow rate being 1.0 mL/min. The number average molecular weight (Mn), the weight average molecular weight (Mw) and the Z-average molecular weight (Mz) were universally calibrated using Polystyrene standard materials of Easical A and Easical B (manufactured by Agilent). Thereafter, it was calculated in terms of polyethylene.

5) TREF curve: The analysis was carried out using Cross-Fractionation Chromatography (CFC; PolymerChar CFC-2) as follows. Two Olexis and one Guard were used as the separation column, and the column temperature was maintained at 150° C. Calibration was performed using a standard polystyrene set from Polymer Laboratory Inc. Trichlorobenzene containing 0.0125% by weight of antioxidant (BHT) was used as an eluent. The sample concentration was 75 mg/mL and the pump flow rate was 1.0 mL/min. After the sample was injected, the oven and the sample were heated to 150° C. at a heating rate of 40° C./min and maintained at 150° C. for 60 minutes. Thereafter, the sample was lowered to 95° C. at a cooling rate of 40° C./min. The sample was kept at 95° C. for 45 minutes, cooled to 30° C. at a cooling rate of 0.5° C./min, and kept for 30 minutes. Thereafter, the sample is raised from 35° C. to 120° C. At this time, 22 temperature-dependent fractions are formed at intervals of 4° C., and 0.5 ml of sample is injected into each fraction. The eluted fractions were passed through a TREF column and an Olexis column to obtain TREF values and molecular weights simultaneously. The molecular weight was universally calibrated using polystyrene standard materials of Easical A and Easical B (manufactured by Agilent), and it was calculated in terms of polyethylene. Data processing was performed using "CFC Calibration", which is a device-attached analysis program. The analysis took about 600 minutes, and an infrared spectrometer was used as a detector.

Figure 5:
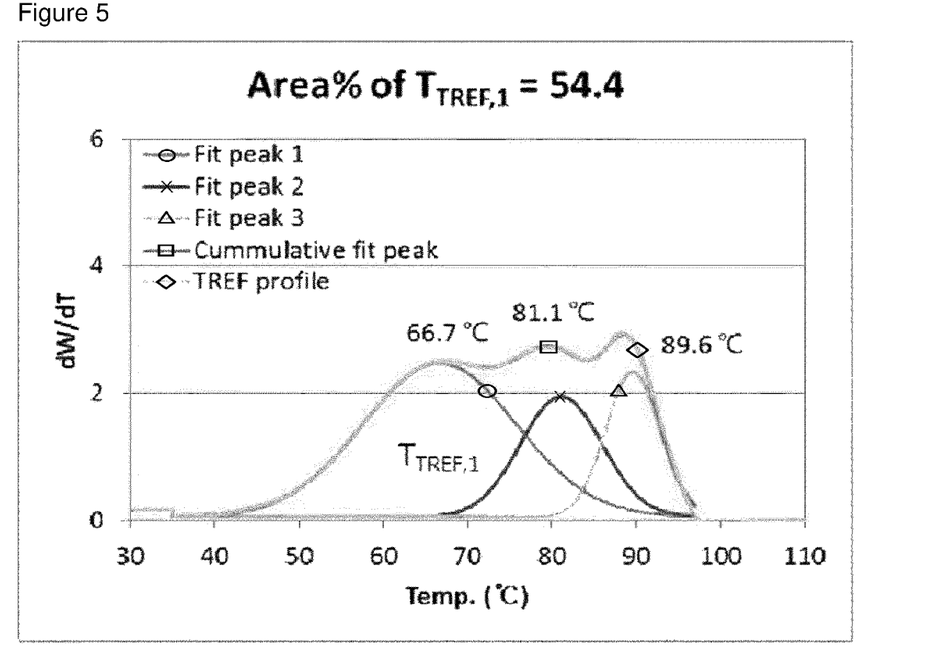
FIG. 5 is a graph showing CFC(Cross-Fractionation Chromatography) analysis of polyolefin resin in Example 1 for Melt Blend according to the present invention.

6) Deconvoluted TREF Peak located within the range of 60 to 70° C.: The TREF curve of multimodal distribution which was obtained using CFC was deconvoled into a plurality of individual peaks using a Gaussian function in the OriginPro 8.6 program. Thereafter, a peak located at 60 to 70° C. was taken and the area of the peak was calculated in comparison with the total area (See: FIG. 5).

7) Molecular weight-Comonomer distribution and average number of SCB per 1000 C: The analysis was carried out using Gel Permeation Chromatography with Infrared Detector (IR Detector) (GPC-IR; Polymer Laboratory Inc. 220 System) as follows. Two Olexis and one Guard were used as the separation column, and the column temperature was maintained at 160° C. Calibration was performed using a standard polystyrene set from Polymer Laboratory Inc. Trichlorobenzene containing 0.0125% by weight of antioxidant (BHT) was used as an eluent. The measurement was carried out for 22 minutes in a condition of the sample concentration being 2.0 mg/mL, the injection content being 0.5 mL and a pump flow rate being 1.0 mL/min. The molecular weight was universally calibrated using polystyrene standard materials of Easical A and Easical B (manufactured by Agilent), and it was calculated in terms of polyethylene. The average number of SCBs per 1,000 carbons was calculated from the ratio of the intensity ($I_{2,960}/I_{2,928}$) of the $CH_3$ peak located at 2,960 cm$^{-1}$ to the intensity of the $CH_2$ peak located at 2,928 cm$^{-1}$, after receiving a Fourier transformed IR (Fourier transform IR) signal at 3,000 to 2,700 cm 8) COI(Comonomer Orthogonal Index): Mz, Mn and SCB contents were measured using the GPC-IR and the COI value was calculated according to Equation 1. In connection with Equation 1, a molecular weight-comonomer distribution graph was prepared in which log value (log Mw) of molecular weight (Mw) is marked in x-axis of the graph and the amount of polymer (dw_dlog Mw) corresponding to the log value (log Mw) and average number of short chain branches (SCB) derived from comonomer (number of branches per 1,000 carbon atoms, unit: number/1,000 C) corresponding to the log value (log Mw) are marked in y-axis of the graph. When plotting the molecular weight-comonomer distribution curve, "SCB number at Mz" represents average number of branches derived from comonomers per 1000 carbon atoms at Z-average molecular weight (Mz), and "SCB number at Mn" represents average number of branches derived from comonomers per 1000 carbon atoms at number-average molecular weight (Mn)

$$\text{Comonomer Orthogonal Index } (COI) = \frac{SCB \text{ number at } Mz - SCB \text{ number at } Mn}{\log Mz - \log Mn} \quad \text{[Equation 1]}$$

9) dart falling impact strength impact strength: ASTM D1709

TABLE 1

|  | Melt Index (MI2.16) g/10 min | Density g/cc | Melt flow rate ratio (MI21.6/ MI2.16) | $M_w$ g/mol | $M_w/M_n$ | $M_z/M_w$ | Deconvoluted TREF peak area (at 60~70° C.) | Average SCB number/ 1,000C | COI |
|---|---|---|---|---|---|---|---|---|---|
| Example 1-1 for Polymerization | 11.26 | 0.9315 | 27.2 | 63,277 | 4.04 | 3.38 | 0 | 6.78 | 2.97 |
| Example 1-2 for Polymerization | 14.06 | 0.9368 | 31.0 | 57,471 | 4.46 | 3.49 | 0 | 8.39 | 2.19 |
| Example 1-3 for Polymerization | 14.52 | 0.9292 | 26.2 | 56.308 | 3.56 | 3.17 | 0 | 11.08 | 5.20 |
| Example 2-1 for Polymerization | 0.18 | 0.9100 | 22.9 | 188,134 | 3.45 | 2.54 | 66.4 | 16.96 | 8.35 |
| Example 2-2 for Polymerization | 0.26 | 0.9121 | 24.3 | 161,391 | 3.69 | 2.66 | 72.8 | 14.81 | 5.28 |
| Example 2-3 for Polymerization | 0.33 | 0.9111 | 25.6 | 153,077 | 4.40 | 2.90 | 72.1 | 19.36 | 7.52 |
| Comparative Example 1 for Polymerization | 0.83 | 0.9171 | 20.3 | 110,903 | 2.85 | 2.24 | 0 | 11.60 | 5.01 |
| Comparative Example 2 for Polymerization | 1.11 | 0.9174 | 16.0 | 101,159 | 2.76 | 2.00 | 0 | 11.82 | 1.08 |
| Example 1 for Melt Blend | 0.91 | 0.9189 | 28.5 | 108,856 | 3.86 | 2.83 | 48.0 | 13.93 | 7.32 |
| Example 2 for Melt Blend | 0.89 | 0.9196 | 36.1 | 125,838 | 5.57 | 3.78 | 54.4 | 13.36 | 7.68 |
| Example 3 for Melt Blend | 0.81 | 0.9189 | 32.3 | 126,188 | 5.09 | 3.41 | 58.0 | 13.88 | 8.33 |
| Example 4 for Melt Blend | 0.57 | 0.9215 | 36.0 | 136,330 | 5.84 | 3.33 | 51.5 | 13.27 | 8.51 |
| Example 5 for Melt Blend | 0.56 | 0.9186 | 35.7 | 145,044 | 5.16 | 3.91 | 62.7 | 15.68 | 8.57 |

TABLE 2

|  | Dart falling impact strength (gf) |
|---|---|
| Film Preparation 1 | 613 |
| Film Preparation 2 | 489 |
| Film Preparation 3 | 1172 |
| Film Preparation 4 | 617 |
| Film Preparation 5 | 800 |
| Comparative Film Preparation 1 | 760 |
| Comparative Film Preparation 2 | 218 |

Figure 1:
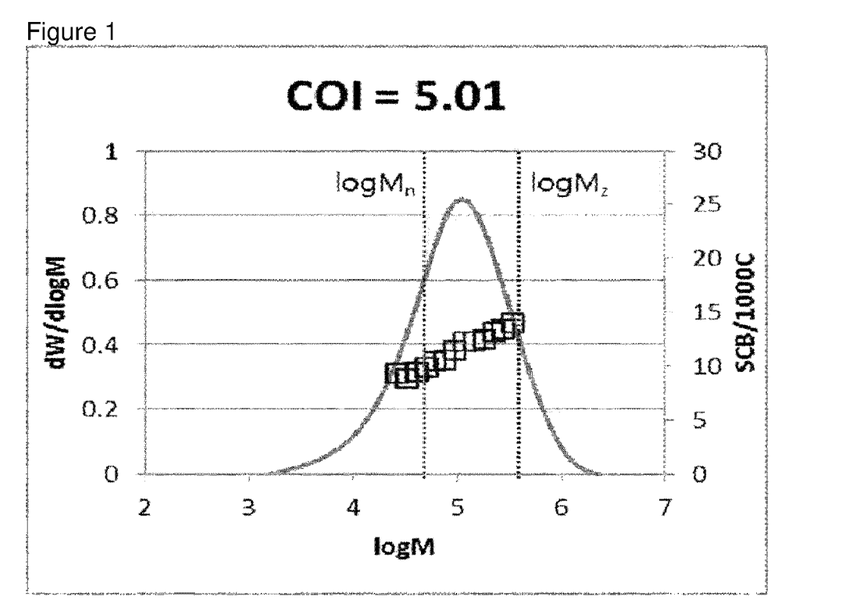
FIG. 1 is a graph showing GPC-IR (Gel Permeation Chromatography with IR detector) analysis of polyolefin resin in Comparative Example 1 for Polymerization.
Figure 2:
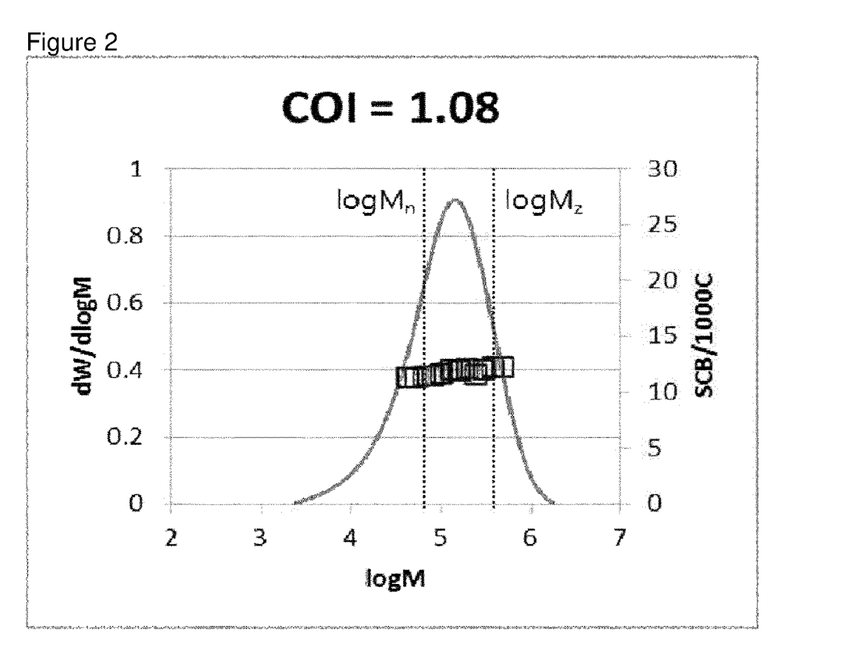
FIG. 2 is a graph showing GPC-IR analysis of polyolefin resin in Comparative Example 2 for Polymerization.

From Table 1 and Table 2, it can be confirmed that compared to the polyolefin (Comparative Example 2 for Polymerization) derived from the zirconium metallocene catalyst (Preparation 2), polyolefin (Comparative Example 1 for Polymerization) derived from a hafnium-based metallocene catalyst (Preparation 1) has wide molecular weight distribution and high melt flow rate ratio, thus accordingly it has excellent processability. Also, it can be confirmed that polyolefin (Comparative Example 1 for Polymerization) has BOCD structure with a COI value of 5.01, so that the film (Comparative Example 1 for Film) prepared from polyolefin in Comparative Example 1 for Polymerization has excellent dart falling strength, compared to the film (Comparative Example 2 for Film) prepared from the polyolefin in Comparative Example 2 for Polymerization). FIG. 1 and FIG. 2 are graphs of GPC-IR analysis of polyolefin resins in Comparative Example 1 for Polymerization and Comparative Example 2 for Polymerization, respectively, showing the molecular weight-comonomer distribution.

It can be confirmed that melt blends (Examples 1 to 5 for Melt Blend) have wide molecular weight distribution and high melt flow rate ratio is high, compared to the case of not blending (Comparative Example 1 for Polymerization), so the melt blends have excellent processability and also it has a more developed BOCD structure from COI values of 7 to 9. Wherein the blends were prepared by mixing the first polymer component (Examples 1-1 to 1-3 for polymerization) with high MI and density and the second polymer component (Examples 2-1 to 2-3 for polymerization) with low MI and density in a weight ratio of 4:6 to 5:5, using the hafnium-based catalyst. Also it can be confirmed that the films (Film Preparation 3 and 5) derived from the melt blends (Examples 3 and 5 for of Melt Blend) which have 58 to 63% of peak area of the deconvoluted TREF located in the range of 60 to 70° C., have superior dart falling impact strength compared to the film (Comparative Film Preparation 1) derived from the polymer (Comparative Example 1 for Polymerization).

Figure 3:
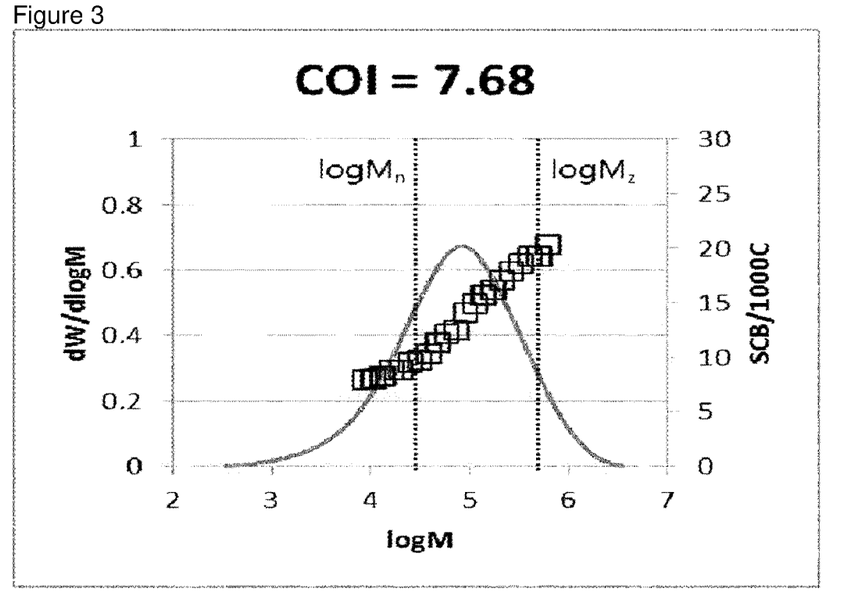
FIG. 3 is a graph showing GPC-IR analysis of polyolefin resin in Example 1 for Melt Blend 1 according to the present invention.
Figure 4:
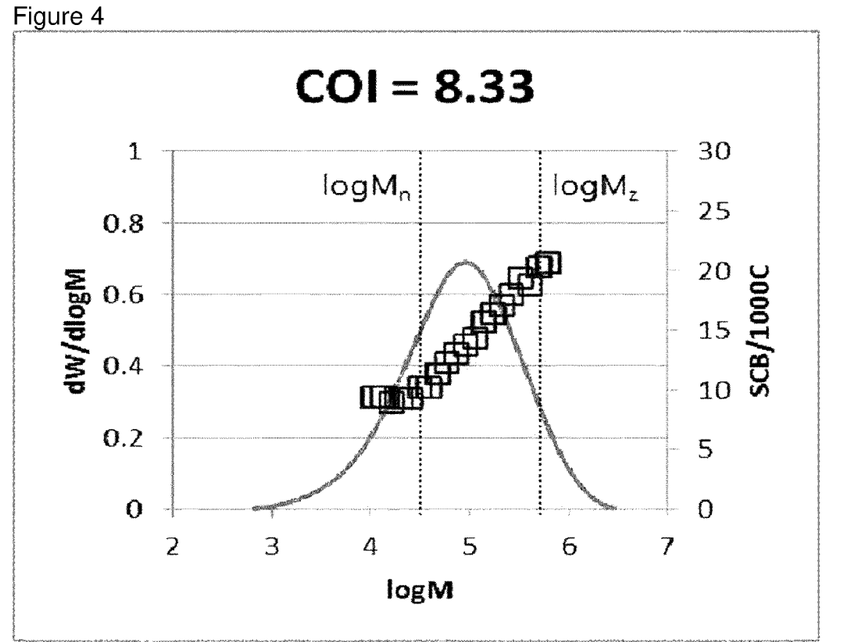
FIG. 4 is a graph showing GPC-IR analysis of polyolefin resin in Example 2 for Melt Blend according to the present invention.
Figure 6:
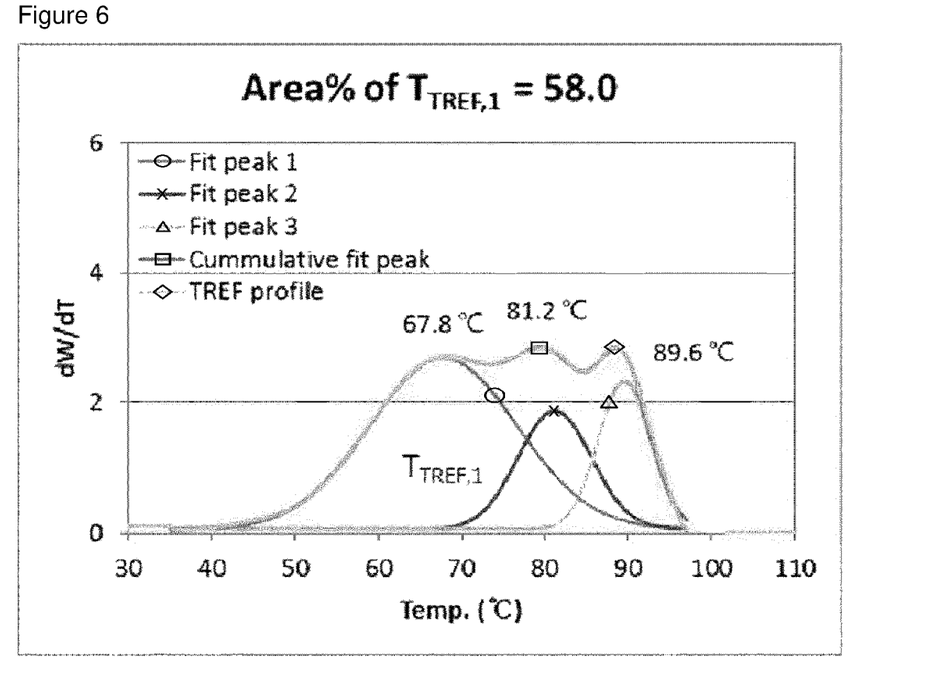
FIG. 6 is a graph showing CFC analysis of polyolefin resin in Example 2 for Melt Blend according to the present invention.

Referring Table 1 and Table 2, analysis results of the polyolefins in Examples 1 to 3 for Melt Blend having a melt index of 0.81 to 0.91 and a density of 0.9189 to 0.9196 and films prepared therefrom (Film Preparation 1 to 3) shows that when the MI of the second polymer component having a low MI and density is further lowered, the COI and the peak area of the deconvoluted TREF located in the range of 60 to 70° C. increase, and accordingly their dart falling impact strength becomes more excellent, and when the MI of the second polymer component having low MI and density is the lowest and its content is relatively small, 50%, compared to the first polymer component having a high MI and density, COI and the peak area of the deconvoluted TREF located at 60 to 70° C. are small, and accordingly its dart falling impact strength become low. FIG. 3 and FIG. 4 are graphs showing GPC-IR analysis of polyolefin resin in Example 1 for Melt Blend and Example 2 for Melt Blend according to the present invention, respectively, showing the molecular weight-comonomer distribution. FIG. 5 and FIG. 6 are graphs showing CFC analysis of polyolefin resin in Example 1 for Melt Blend and Example 2 for Melt Blend according to the present invention, respectively, showing TREF peak.

The invention claimed is:

1. A polyolefin resin satisfying following properties (1) to (6):
   (1) melt index (MI2.16, 190° C., under a load of 2.16 kg) is 0.1 to 1.5 g/10 min;
   (2) density is 0.91 to 0.93 g/cc;
   (3) polydispersity Indexe (weight-average molecular weight/number-average molecular weight (Mw/Mn)) is 3 to 7;
   Z-average molecular weight/weight average molecular weight (Mz/Mw) is 2.3 to 4.5;
   (5) Comonomer Orthogonal Index (COI) value calculated by the following Equation 1 is 5 to 12; and
   (6) when a temperature rising elution fractionation (TREF) curve of multimodal distribution is deconvoluted, an area of the TREF curve having a peak at 60 to 70° C. is 40 to 65% of a total area of the TREF curve of multimodal distribution, $$\text{Comonomer Orthogonal Index } (COI) = \frac{SCB \text{ number at } Mz - SCB \text{ number at } Mn}{\log Mz - \log Mn} \quad \text{[Equation 1]}$$

in Equation 1, "SCB" represents an average number of short chain branches, "SCB number at Mz" represents average number of short chain branches derived from comonomers per 1000 carbon atoms at Z-average molecular weight (Mz), and "SCB number at Mn" represents average number of short chain branches derived from comonomers per 1000 carbon atoms at number-average molecular weight (Mn) when a molecular weight-comonomer distribution graph was prepared in which log value (log Mw) of molecular weight (Mw) is marked in x-axis of the graph and the amount of polymer (dw_dlog Mw) corresponding to the log value (log Mw) and average number of short chain branches (SCB) derived from comonomer (number of branches per 1,000 carbon atoms, unit: number/1,000 C) corresponding to the log value (log Mw) are marked in y-axis of the graph, and wherein melt flow rate ratio (MFRR; MI21.6/MI2.16, the MI21.6 is a melt index measured at 190° C. and 21.6 kg load condition) is 17 to 40.

2. The polyolefin resin of claim 1, wherein when the TREF (Temperature curve is deconvoluted, a number of deconvoluted peaks in the TREF curve is 2 to 5.

3. A method for preparing a polyolefin resin, comprising the steps of:
   polymerizing a first polymer having high density and high melt index (MI) by introducing a metallocene supported catalyst, ethylene and alpha-olefin to a first reactor of two or more serially connected reactors selected from the group consisting of a slurry polymerization reactor and a gas phase polymerization reactor; and
   polymerizing polyolefin resin by transferring the first polymer to a second reactor of the two or more serially connected reactors,
   wherein the polyolefin resin satisfies the following physical properties: (1) melt index (MI2.16, 190° C., under a load of 2.16 kg) is 0.1 to 1.5 g/10 min; (2) density is 0.91 to 0.93 g/cc; (3) polydispersity Index (weight average molecular weight)/(number average molecular weight (Mw/Mn)) is 3 to 7; (4) Z-average molecular weight/weight-average molecular weight (Mz/Mw) is 2.3 to 4.5; (5) comonomer orthogonal index (COI) value calculated by the following Equation 1 is 5 to 12; and (6) when a temperature rising elution fractionation (TREF) curve of multimodal distribution is deconvoluted, an area of the TREF curve having a peak at 60 to 70° C. is 40 to 65% of a total area of the TREF curve of multimodal distributio, $$\text{Comonomer Orthogonal Index } (COI) = \quad \text{[Equation 1]}$$
$$\frac{SCB \text{ number at } Mz - SCB \text{ number at } Mn}{\log Mz - \log Mn}$$

in Equation 1, "SCB" represents an average number of short chain branches, "SCB number at Mz" represents average number of short chain branches derived from comonomers per 1000 carbon atoms at Z-average molecular weight (Mz), and "SCB number at Mn" represents average number of short chain branches derived from comonomers per 1000 carbon atoms at number-average molecular weight (Mn) when a molecular weight-comonomer distribution graph was prepared in which log value (log Mw) of molecular weight (Mw) is marked in x-axis of the graph and the amount of polymer (dw_dlog Mw) corresponding to the log value (log Mw) and average number of short chain branches (SCB) derived from comonomer (number of branches per 1,000 carbon atoms, unit: number/1,000 C) corresponding to the log value (log Mw) are marked in y-axis of the graph, and wherein melt flow rate ratio (MFRR; MI21.6/MI2.16, the MI21.6 is a melt index measured at 190° C. and 21.6 kg load condition) is 17 to 40.

4. A method for preparing a polyolefin resin, comprising the steps of:
   introducing a metallocene supported catalyst, ethylene and alpha-olefin into a reactor selected from the group consisting of a slurry polymerization reactor and a gas phase polymerization reactor, and then performing a polymerization process, to prepare a first polymer having a melt index (MI) of 4 to 15 and a density of 0.925 to 0.940 g/cc;
   introducing a metallocene supported catalyst, ethylene and alpha-olefin into another reactor selected from the group consisting of a slurry polymerization reactor and a gas phase polymerization reactor, and then performing a polymerization process, to prepare a second polymer having MI of 0.1 to 0.5 and a density of 0.900 to 0.915 g/cc; and
   melt-blending the first polymer and second polymer component to prepare the polyolefin resin,
   wherein the polyolefin resin satisfies the following physical properties: (1) melt index (MI2.16, 190° C., under a load of 2.16 kg) is 0.1 to 1.5 g/10 min; (2) density is 0.91 to 0.93 g/cc;
   (3) polydispersity Index (weight average molecular weight)/(number average molecular weight (Mw/Mn)) is 3 to 7; (4) Z-average molecular weight/weight-average molecular weight (Mz/Mw) is 2.3 to 4.5; (5) comonomer orthogonal index (COI) value calculated by the following Equation 1 is 5 to 12; and (6) when a temperature rising elution fractionation (TREF) curve of multimodal distribution is deconvoluted, an area of the TREF curve having a peak at 60 to 70° C. is 40 to 65% of a total area of the TREF curve of multimodal distribution, $$\text{Comonomer Orthogonal Index } (COI) = \quad \text{[Equation 1]}$$
$$\frac{SCB \text{ number at } Mz - SCB \text{ number at } Mn}{\log Mz - \log Mn}$$

in Equation 1, "SCB" represents an average number of short chain branches, "SCB number at Mz" represents average number of short chain branches derived from comonomers per 1000 carbon atoms at Z-average molecular weight (Mz), and "SCB number at Mn" represents average number of short chain branches derived from comonomers per 1000 carbon atoms at number-average molecular weight (Mn) when a molecular weight-comonomer distribution graph was prepared in which log value (log Mw) of molecular weight (Mw) is marked in x-axis of the graph and the amount of polymer (dw_dlog Mw) corresponding to the log value (log Mw) and average number of short chain branches (SCB) derived from comonomer (number of branches per 1,000 carbon atoms, unit: number/1,000 C) corresponding to the log value (log Mw) are marked in y-axis of the graph, wherein melt flow rate ratio (MFRR; MI21.6/M12.16, the MI21.6 is a melt index measured at 190° C. and 21.6 kg load condition) is 17 to 40.

5. The method of claim 3, wherein the metallocene supported catalyst comprises a metallocene compound in which a central metal is hafnium.

6. The method of claim 5, wherein the metallocene compound contains one or more ligands selected from the group consisting of 1-propyl cyclopentadienyl radical and 1-butyl cyclopentadienyl radical.

7. The method of claim 4, wherein the metallocene supported catalyst comprises a metallocene compound in which a central metal is hafnium.

8. The method of claim 7, wherein the metallocene compound contains one or more ligands selected from the group consisting of 1-propyl cyclopentadienyl radical and 1-butyl cyclopentadienyl radical.

9. The method of claim 4, wherein a content ratio of the first polymer and the second polymer is 50:50 to 35:65 based on total weight of the polyolefin resin.

* * * * *

UNITED STATES PATENT AND TRADEMARK OFFICE
CERTIFICATE OF CORRECTION

| | | |
|---|---|---|
| PATENT NO. | : 11,680,160 B2 | Page 1 of 1 |
| APPLICATION NO. | : 17/044505 | |
| DATED | : June 20, 2023 | |
| INVENTOR(S) | : Jang Woo Lee et al. | |

It is certified that error appears in the above-identified patent and that said Letters Patent is hereby corrected as shown below:

In the Claims

Claim 2, Column 20, Line 36, please remove the phrase "(Temperature"

Signed and Sealed this
First Day of August, 2023

Katherine Kelly Vidal
*Director of the United States Patent and Trademark Office*